Feb. 21, 1961
A. YALEN
2,972,495
SPRING METAL U-SHAPED ANCHOR
Filed June 8, 1959
2 Sheets-Sheet 1
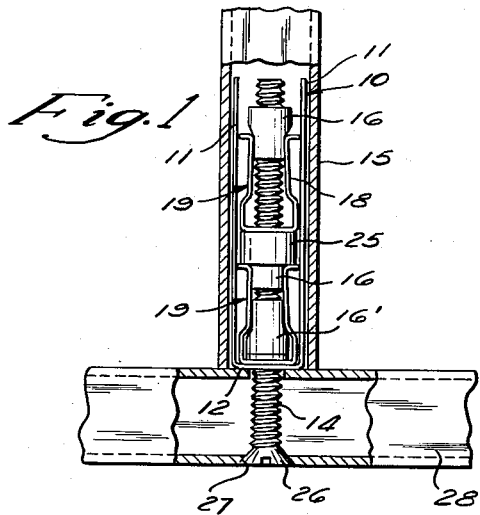
Fig. 1
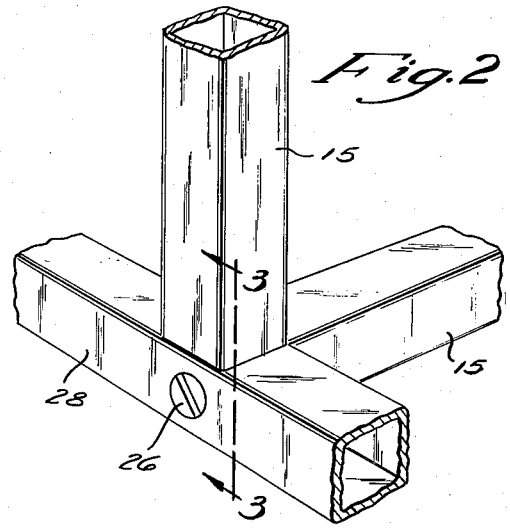
Fig. 2
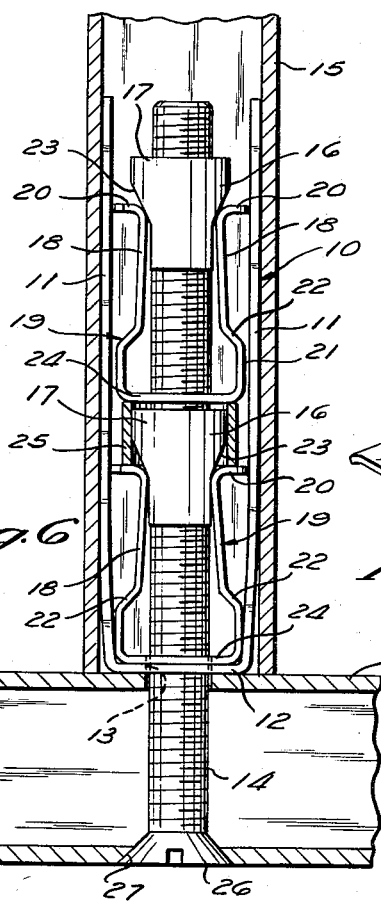
Fig. 6
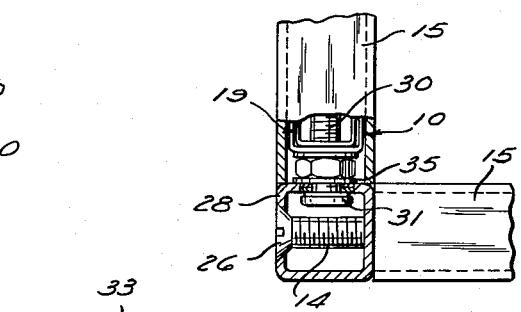
Fig. 3
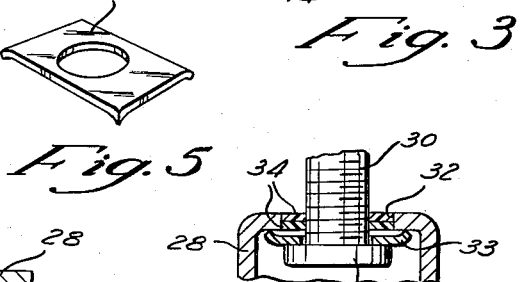
Fig. 5
Fig. 4
INVENTOR.
ABRAHAM YALEN
BY
WATTS & EDGERTON
AH Edgerton
ATTORNEYS Feb. 21, 1961  A. YALEN  2,972,495
SPRING METAL U-SHAPED ANCHOR
Filed June 8, 1959  2 Sheets-Sheet 2

INVENTOR.
ABRAHAM YALEN
BY
WATTS & EDGERTON
ATTORNEYS

United States Patent Office 2,972,495
Patented Feb. 21, 1961

2,972,495
SPRING METAL U-SHAPED ANCHOR

Abraham Yalen, 2292 S. Taylor Road, Cleveland Heights, Ohio

Filed June 8, 1959, Ser. No. 818,926

5 Claims. (Cl. 287—54)

This invention relates broadly to couplings for uniting tubes, metal conduit sections, and similar hollow bodies, and more specifically to expansible spring metal clamps having wedge blocks with draw bolts therein for expanding the arms of the clamps and drawing a similar tubular section into abutting engagement therewith.

The primary object of the invention is to provide a spring metal U clamp and mechanism for the expansion thereof to effect the frictional engagement of the clamp with the inner walls of the tube and the consequent abutting relation of a second similar tube retained by the head of the draw bolt.

The invention further contemplates the use of a plurality of clamps within a tube for the affixation of the end walls of similar tubes in the construction of furniture, show case frames, and certain building structures.

Another object of the invention is to provide a wedging mechanism which will effect a uniform expansion of the arms throughout the length of the clamp.

A further object of the invention resides in the provision of clamping units of uniform size and form for use in tubing of various size.

Another object of the invention is to provide hard spring metal sleeves for the clamps to restrain localized deformation of a soft tubular section, such as aluminum, when the wedges in the clamp are actuated.

A still further object of the invention is to provide a clamping structure that will effect the union of a second tube normal thereto, a third tube normal to the second tube, the axial alignment of a pair of similar tubes and, the union of a plurality of tubes in biased relation to each other.

Another object of the invention is to provide a coupling for the retention of a companion flange or a foot for a table leg which will accommodate adjustment of the height of the leg with ease and dispatch.

Another object of the invention is to provide a clamping unit that may be readily assembled without tools other than a screw driver and/or wrench.

Another object of the invention is to provide clamping devices and an organization of prefabricated tubes machined for assembly by the purchaser into articles of various form, the parts of such articles being packed for shipment in flat, relatively small cartons or boxes.

Further objects of the invention reside in the provision of a clamp for tubular sections of square, rectangular or circular transverse section which is economic of manufacture, designed for ready assembly, and formed to eliminate unsightly welded, brazed or soldered joints.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a vertical sectional view through the medial axes of an assembly of a pair of tube units of T form.

Fig. 2 is a view in perspective of an assembly in the form of a T, with a lateral branch normal to the axes of the head of the T.

Fig. 3 is a detail sectional view of a fragmentary portion thereof, the section being taken as a line 3—3 of Fig. 2.

Fig. 4 is a vertical sectional view shown on an enlarged scale of a typical organization of the clamp, one of the tubes being removed in the interest of clarity.

Fig. 5 is a view in perspective of a washer employed in the assembly.

Fig. 6 is a vertical sectional view of the clamp and associated parts shown on an enlarged scale.

Figure 7:
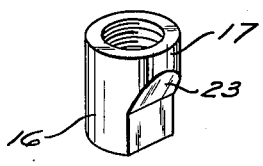
Fig. 7 is a view in perspective of one of the wedge blocks.
Figure 8:
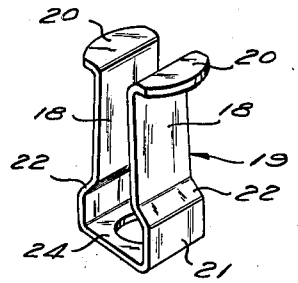
Fig. 8 is a view in perspective of one of the spring clips.

Referring first to Fig. 6, the clamp comprises a spring steel U member 10 embodying a pair of spaced parallel arms 11 and a square base 12 having an opening 13 in the center thereof for a draw bolt 14. The width and spacing of the arms are proportional, in the example illustrated herein, for free sliding movement within a metal tube 15 of square transverse section. The draw bolt is threaded throughout its length, and the free end thereof is flush with the ends of the arms 11. The bolt has tapered wedge blocks 16 threaded thereon with the larger end 17 thereof engaged between the vertical arms 18 of a spring metal clip 19.

The spring clip comprises a pair of spaced parallel arms having transverse wings 20 on the free ends thereof, and an enlarged lower end 21 defined by shoulders 22 in the lower third of the length of the clip. The wedge blocks 16 are formed of round bar stock with flat tapered lands 23 disposed intermediate the wings 20. The upper end of the draw bolt 14 has a second wedge block 16 thereon similar to the lower wedge block, and with the lands 23 thereon engaged with the wings 20 of a second spring metal clip 19. The base 24 of the spring clip 19 has an opening therein for the draw bolt 14. The wings 20 of the second spring clip engage the outer ends of the U member 10 and the base thereof engages the upper face of a freely rotatable sleeve 25 that abuts the upper face of the wings on the subjacent spring clip.

In operation, the draw bolt 14, which is formed with a flat head 26 thereon, is first inserted and seated in a chamfered counterbore 27 in a second tube 28, then the free end of the bolt is inserted through the opening in the opposed wall of the tube 28 and through the opening 13 in the base of the U member 10. The spring metal clip 19 is next mounted on the bolt, the sleeve 25 is then placed over the top of the wedge 16, the upper spring clip 19 is next mounted on the draw bolt, then the upper wedge block 16 is screwed on the bolt.

The U member 10 and the sub-assembly, including the bolt spring clips and wedges referred to above, are next inserted in the tube 15 and the draw bolt 14 is rotated by a screw driver in a cross slot in the head 26 of the bolt to retract the wedges 16 and effect the distention of the arms 11, and also the distention of the arms of the U member 10.

It will be recognized that the engagement of the two spaced pairs of wings 20, with the side walls of the U member, will effect uniform expansion of the arms 11 into impinged relation with the inner walls of the tube 15 and draw the end of the tube 15 into abutting engagement with the outer wall of the tube 28.

As illustrated in Figs. 2, 3 and 4, the construction of the clamps within the lateral tube 15 is identical with the structure of the clamp in the vertical tube, save only that the draw bolt 30 in the vertical tube is formed with a short flat fillister head 31, and the outer face of the tube 28 has an enlarged opening 32 to accommodate the insulation of the head 31 of the bolt in biased relation therewith. A rectangular washer 33 is included in the assembly of the bolt and is inserted in the opening 32 with the head of the bolt by a twisting movement. Fiber filler washers 34 are next inserted into the opening 32, then a plain washer 35, and lock nuts 36, are drawn down against the face of the tube 28. As described above, the draw bolt 30 becomes a fixed stud and the vertical tube assembly is rotatively tightened therein.

Figure 9:
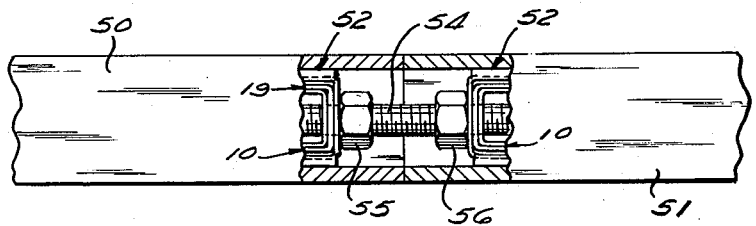
Fig. 9 is a side elevational view of a pair of similar tubes disposed in coaxial alignment.
Figure 10:
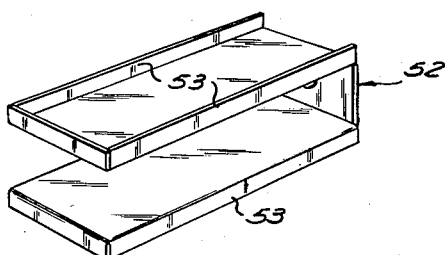
Fig. 10 is a view in perspective of a spacer for use in a tube of a larger transverse section than shown in the preceding figures.

The clamps in the aligned assembly, Fig. 9, are similar to the clamps shown in Fig. 6. The tubes 50 and 51 are, however, of greater transverse section. As shown in Fig. 10, shims 52 are employed in the tubes to accommodate the increased size without modification of the internal clamps. The shims are preferably fabricated from flat strips of sheet metal formed with depending marginal flanges 53 of a height requisite to one-half the difference between the outer dimension of the U member 10 in its unstressed form, and equal in width to the inner dimensions of the tubes 50 and 51. If tube 50 is rectangular, the height of the flanges 53 may be determined by one-half the dimension of the distance of the major transverse axes of the tube and the dimension of the thickness of the clamp and U member 10. The draw bolt 54 is locked against rotation by nuts 55 and 56 engaged with the base of the U member 52 and space from the end of the tubes 50 and 51. The assembly is made with a sprocket wrench in this embodiment and the second tube 51 is rotated about the draw bolt to retract the wedges 16 in the secondary tube.

It will be noted that the structure and mode of operation of the improved clamp will facilitate the use thereof in soft metal tubing, such as aluminum, since the distention of the U member 10 is uniform throughout the length thereof and the clamping structure is free from localized areas of pressure that would bulge the face of the tube opposite the wings.

As will be seen in Fig. 1, the coupling comprises a third wedge block 16' seated in the spring clip 19 with the base 24 thereof seated in the base of the U members 10. The top of the wedge block 16' abuts the bottom of the superjacent wedge 16 and the bore therein is not threaded but rides freely over the crest of the threads on the draw bolt 14. The wedge block 16' delimits the downward movement of the superjacent wedge and the distention of the wings 20 on the springs clip 19 so the major expansion of the clamp will be imposed on the upper end of the U member when the outer wedge is brought into impinged relation with the top of the wedge block 16' as occurrs when the draw bolt is held stationary and the vertical tube 15 is rotated.

Figure 11:
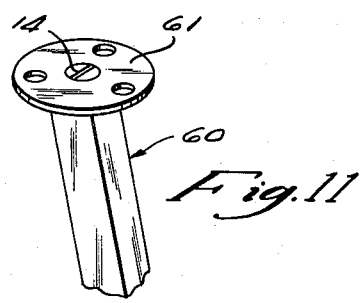
Fig. 11 is a view in perspective illustrating the use of the clamp in a table leg.

The form illustrated in Fig. 11 shows a table leg 60 of tubular form with an adjustable foot thereon. The foot comprises a flange 61 machined for a flat head draw bolt 14. The end of the table leg may be sheared at a right angle or in biased relation to the medial axes of the tube. The clamp is similar in all respects to the clamp heretofore described and is inserted in the table leg and titled at the requisite angle as it is tightened to accommodate the angular disposition of a biased table leg. The flange 61 may be formed with a plurality of chamfered holes therein to accommodate anchorage thereof to the table.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A coupling for uniting tubular bodies comprising a spring steel U member having an opening in the base thereof, the arms of said U member disposed in longitudinal sliding engagement within a tube, an upper and lower U-shaped spring clip each having an opening in the base thereof, the arms thereof extending in the same direction and relative position as the arms of said U member and arranged in coaxial alignment with the base opening thereof, lateral wings on the upper free ends of said spring clips, a draw bolt in said openings in said spring clips and said U member and extending through similarly aligned openings in opposite surfaces of a second tube, an upper and a lower wedge block screw threaded on said draw bolt with the larger ends thereof superjacent said wings, whereby rotation of the said draw bolt will distend the wings into impinged relation with said U member and effect the frictional engagement thereof throughout its length with the inner wall of said tube and draw said tube into abutting engagement with said second tube.

2. A coupling for uniting tubular bodies comprising a spring steel U mmeber having an opening in the base thereof, the arms of said U member disposed in longitudinal sliding engagement within a tube, an upper and lower U-shaped spring clip each having an opening in the base thereof, the arms thereof extending in the same direction and relative position as the arms of said U member and arranged in coaxial alignment with the base opening thereof, a fiber washer between the base of the lower spring clip and the base of said U-shaped member, lateral wings on the upper free ends of said spring clips, a draw bolt in said openings in said spring clips and said U member and extending through similarly aligned openings in opposite surfaces of a second tube, an upper and a lower wedge block screw threaded on said draw bolt with the larger ends thereof superjacent said wings, and a sleeve means positioned between said spring clips, whereby rotation of the said draw bolt will distend the wings into impinged relation with said U member and effect the frictional engagement thereof throughout its length with the inner wall of said tube and draw said tube into abutting engagement with said second tube.

3. The combination of tubular bodies and a tube coupling device therefor, said tubular bodies comprising a first tube, rectangular in cross section and having one end abutting a surface of a second such tube and forming a T therewith, a coupling for uniting said tubular bodies comprising a spring steel U member having an opening in the base thereof, the arms of said U member disposed in longitudinal sliding engagement within said first tube, an upper and lower U-shaped spring clip each having an opening in the base thereof, extending in the same direction and relative position as the arms of said U member and arranged in coaxial alignment with the base opening thereof, lateral wings on the upper free ends of said spring clips, a draw bolt in said openings in said spring clips and said U member and extending through similarly aligned openings in opposite surfaces of said first tube, an upper and a lower wedge block screw threaded on said draw bolt with the larger ends thereof superadjacent said wings and a sleeve means positioned between said spring clips whereby rotation of said draw bolt will distend the wings into infringed relation with said U member and effect the frictional engagement thereof throughout its length inside the first tube and draw said tube into abutting engagement with said second tube.

4. The combination of claim 3 with a third such tube having one end abutting said second tube on a surface adjacent the said first tube and in the same plane as the said first tube, a second said tube coupling device mounted in said third tube, the draw bolt thereof having a fillister head, an opening in the abutted surface of said second tube, a metal oblong washer mounted on said draw bolt adjacent said fillister head, said oblong washer having its width dimension less than and its length greater than the dimension of said opening in the second tube, the said oblong washer and draw bolt head inserted through said tube opening, a second washer mounted on said draw bolt adjacent said oblong washer and inserted in said tube opening to maintain said draw bolt in axial alignment with said tube opening, whereby rotation of the said third tube, while the said draw bolt remains stationary, will distend the wings on said spring clips into impinged relation with the said U member and effect the frictional engagement thereof throughout its length with the inner wall of said third tube and draw said third tube into abutting engagement with said second tube.

5. The combination of tubular bodies and a tube coupling device therefor, said tubular bodies comprising a first tube, having one end abutting a surface of a second such tube and forming a T therewith, a coupling for uniting said tubular bodies comprising a spring steel U member having an opening in the base thereof, the arms of said U member disposed in longitudinal sliding engagement within said first tube, an upper and lower U shaped spring clip each having an opening in the base thereof, extending in the same direction and relative position as the arms of said U member and arranged in coaxial alignment with the base opening thereof, lateral wings on the upper free ends of said spring clips, a draw bolt in said openings in said spring clips and said U member and extending through similarly aligned openings in opposite surfaces of said first tube, an upper and a lower wedge block screw threaded on said draw bolt with the larger ends thereof superjacent said wings and a sleeve means positioned between said spring clips whereby rotation of said draw bolt will distend the wings into infringed relation with said U member and effect the frictional engagement thereof throughout its length inside the first tube and draw said tube into abutting engagement with said second tube.

References Cited in the file of this patent
UNITED STATES PATENTS

| | | |
|---|---|---|
| 511,359 | Ragoncy | Dec. 26, 1893 |

FOREIGN PATENTS

| | | |
|---|---|---|
| 305,966 | Great Britain | Feb. 12, 1929 |
| 1,015,779 | France | Oct. 23, 1952 |